May 26, 1964   K. R. OLIVER, JR., ETAL   3,134,255
CARPET WEAR TESTER

Filed May 25, 1961   6 Sheets-Sheet 3

INVENTORS
KENNETH R. OLIVER, JR.
T. B. LEFFERDINK
RICHARD F. SMITH
BY
ATTORNEY

May 26, 1964    K. R. OLIVER, JR., ET AL    3,134,255
CARPET WEAR TESTER

Filed May 25, 1961    6 Sheets-Sheet 4

INVENTORS
KENNETH R. OLIVER, JR.
T. B. LEFFERDINK
RICHARD F. SMITH

BY
ATTORNEY

INVENTORS
KENNETH R. OLIVER, JR.
T. B. LEFFERDINK
RICHARD F. SMITH

BY
ATTORNEY

United States Patent Office 3,134,255
Patented May 26, 1964

3,134,255
CARPET WEAR TESTER
Kenneth R. Oliver, Jr., Newport News, Va., Theodore B. Lefferdink, Sacramento, Calif., and Richard F. Smith, Newport News, Va., assignors to The Dow Chemical Company, Midland, Mich., a corporation of Delaware
Filed May 25, 1961, Ser. No. 112,557
6 Claims. (Cl. 73—7)

This invention relates to wear testing devices and is particularly directed to an improved apparatus for accurately testing the wear on material such as rugs and carpets.

In order accurately to determine the wear qualities and life expectancy of carpet and rug materials, it is necessary to subject the material repetitively to conditions which closely approximate actual use of such materials. A close study of the loading of carpet surfaces by normal walking thereon made by high-speed cameras has revealed two pronounced and interesting characteristics. One of these is that there is normally no relative sliding motion between the carpet surface and a person's foot under usual walking conditions and, secondly, the load is usually applied at an acute angle of attack increasing from zero load to a maximum at a substantially vertical pressure to the surface of the rug and then continuing past the perpendicular to the rug surface to an acute angle of departure, during which latter period the pressure progressively decreases from maximum to zero. These characteristics of normal carpet wear have generally not been approximated in conventional wear testing machines, as in most instances such machines test the carpet for abrasion, and there is substantially no abrasion in normal walking on a carpet. The above characteristics indicate that in order correctly to test the wear and life expectancy of a carpet, the load should be applied at a substantially predetermined acute angle, pass through the vertical to the surface, and continue to another predetermined acute angle, while the load increases from the initial contact with the carpet to a maximum and then progressively decreases to zero at the point of departure. This generates a reversal of variation in both direction and magnitude of compressive and bending stresses in the carpet pile.

In accordance with the present invention, the wear testing device is designed to apply a pressure to a sample of carpet material at a predetermined acute angle of attack, increase the pressure from zero when initially contacting the surface of the sample to an adjustable predetermined maximum pressure perpendicular to the surface of the test sample, and progressively change the angle of the load to another predetermined acute angle past the vertical from the angle of attack, during which latter loading the pressure decreases from maximum to zero at the time that the load is removed from the sample. This type of loading may be repeated a predetermined number of times on a given piece of material and the weight of the material before the test and after the test will indicate the wear which has occurred. Possible changes in specimen color, evidence of broken fibers, and soiling are further useful adjuncts which can be observed.

Preferably, the testing device includes an arrangement for intermittently advancing the material so that a different part of the material is presented to the wear loading element for each loading cycle. A very practical method for thus moving the test sample is to mount it upon a rotatable table, which is held stationary during the loading cycle and is turned through an angle of advance during the return stroke of the loading mechanism while the loading mechanism is out of contact with the surface of the sample. In this manner, the same area may be cyclically subjected to the same load test and will also be given a rest period between repetitive loadings, so as more nearly to approximate actual carpet use.

In addition, if desired, the load may be applied to the test sample through different loading elements which may vary in size, so as more nearly to approximate the different wear to which a carpet pile is subjected by different sizes of feet and particularly heel surfaces. In addition, it is desirable that the testing device should have an arrangement for varying the maximum pressure to which the sample is subjected during each loading cycle and to be able to vary the actual deflection to which the pile is subjected during each test cycle; that is, the actual penetration or total compressive movement in terms of the maximum deflection to which the pile is subjected measured in terms of movement from its normal undeflected surface position to its deflection under maximum vertical pressure thereon. In accordance with the present invention, all of these features are adjustably provided and can be predetermined so that comparative results of tests on different sample materials can readily be made.

A testing device made in accordance with the present invention preferably includes an intermittently rotatable table for supporting a test sample and a rocking, reciprocating loading plunger which is adapted to engage a test sample on the table while the table is stationary and to subject the sample to a pressure which gradually varies from zero to a predetermined maximum and back to zero during each engagement with the surface of the test sample. This plunger initially engages the test sample at a variable predetermined acute angle of attack at zero pressure and progressively varies the angle of application of pressure on the sample from the initial angle of attack past the perpendicular to the sample at substantially maximum pressure to a variable predetermined acute angle of departure at zero pressure and is then returned to the initial sample engaging position while raised out of contact with the sample. During this return movement of the plunger, the table is rotated through an angle of advance to present a different area of material to the action of the plunger. Any suitable mechanism for obtaining this type of action may be utilized, and a preferred embodiment of such a device is illustrated in the drawings, together with modifications of certain details which may be found more desirable for testing various types of materials.

This application is directed to an improvement to the invention covered by Patent 3,102,414, P. C. Wharff, Jr., September 3, 1963, assigned to the same assignee as the present invention.

An object of this invention is to provide an improved wear testing device.

Another object of this invention is to provide a carpet wear testing device which closely simulates actual carpet wear in use at an accelerated rate.

A further object of this invention is to provide an improved carpet wear tester which can be adjustably loaded for variable impact or inertial and maximum loadings.

Still another object of the present invention is to provide an improved carpet wear testing device having a variable predetermined penetration or maximum amount of compressive travel and having a variable range of predetermined angles of attack and departure of the carpet engaging member with the carpet.

Further objects and advantages of this invention will become apparent from the following description referring to the accompanying drawings, and the features of novelty which characterize this invention will be pointed out with particularity in the claims appended to and forming a part of this specification.

Figure 7:
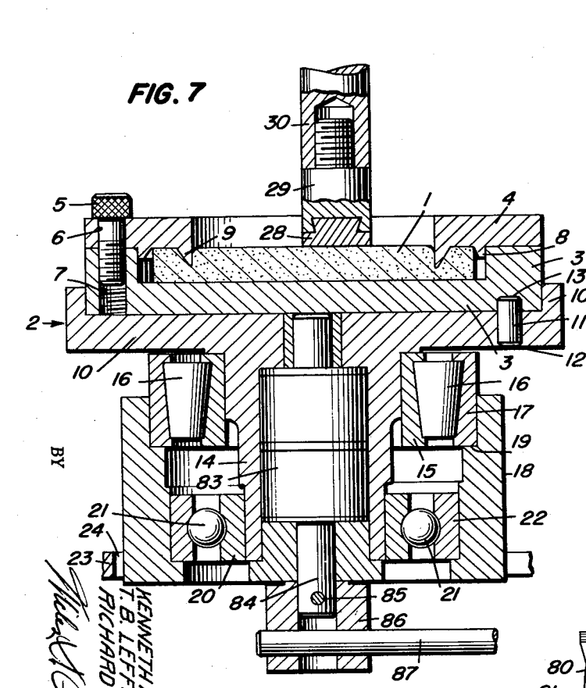
FIG. 7 is an enlarged sectional view illustrating details of the test specimen supporting table and loading device.

Referring to the drawings, a wear testing device particularly adaptable for testing the wearing characteristics of rug and carpet materials is illustrated which embodies the principles for closely simulating the wear to which rugs and carpets actually are subjected during normal usage. In most instances, rugs and carpets on floors are held stationary and the pile thereof is subjected to compressive and bending stresses when walked upon in a normal fashion. In accordance with the present invention, a sample test specimen of rug or carpet material 1 is cut to a suitable size for retention on a supporting table 2. In the illustrated construction, the table 2 comprises a material supporting plate 3 which is substantially circular and on which the test specimen of material 1 is adapted to be firmly clamped against relative rotation by a retaining ring 4. This ring is secured to the plate 3 in any suitable manner, as by a plurality of substantially equally spaced bolts 5 which extend through openings 6 in the retaining ring 4 and threadedly engage corresponding openings 7 around the periphery of the plate 3. Preferably, the retaining ring 4 is formed with an annular axially extending flange 8 having an outer diameter substantially equal to the inner diameter of an upstanding annular flange 3' on the plate 3, so that the flange 8 on the ring 4 is adapted to fit snugly within the plate flange 3' and forms a guide which centers the ring 4 on the plate 3. Preferably, a second axially extending annular flange 9 is formed along the inner periphery of the retaining ring 4 and, as is best seen in FIG. 7, clamps the test specimen 1 securely in position on the plate 3 by extending or biting into the pile of the test specimen. If desired, the flange 9 on the retaining ring may be of a discontinuous configuration and present spaced or connected teeth which more effectively bite into and grip the test specimen. Such a construction not only assures the secure retention of a test specimen on the supporting table, but also assures that each sample of material tested will have been held in the same manner and that the same size sample will have been exposed to the test loading and stressing procedures, thus assuring a basis for comparing the wear on different materials according to selected test conditions.

In this manner, a series of test specimens may be prepared in advance for testing them under the same conditions; that is, under the same loading pressure for substantially the same periods of time at the same rates of operation of the testing device and under substantially the same ambient conditions.

In order to facilitate the quick mounting and dismounting of the test specimen supporting plate 3, the table is formed with a base 10 having an annular flange 10' extending axially from one side thereof along the outer periphery and having an inner diameter substantially equal to the outer diameter of the plate 3 so that the plate 3 can be snugly seated on the base 10 within the flange 10'. A locating pin 11 is securely press-fitted into an opening 12 in the base 10 and projects outwardly from the surface of the plate 10 spaced inwardly from the annular flange 10'. The plate 3 is adapted to be held against rotation when seated on the base 10 by fitting a socket 13, in the side thereof away from the flange 3', over the projecting end of the pin 11. In this manner, the plate 3 always is definitely located on the base 10 in driving engagement therewith through the pin 11.

The table base 10 is formed with a supporting hub 14, which extends axially from the side of the base 10 opposite the annular flange 10'. This hub 14 is securely supported against axial movement and tilting by a pair of anti-friction bearings. The weight of the supporting table and the thrust imposed thereon during tests are transmitted through base 10 to an inner race 15 of a tapered roller bearing comprising rollers 16 mounted between the inner race 15 and an outer bearing race 17. A supporting frame 18 is formed with a bearing supporting shoulder 19 on which the outer bearing race 17 rests. In order to assure against tilting of the supporting table during tests, it is desirable that the table should be supported by a pair of axially spaced bearings. This is conveniently obtained by arranging a set of ball bearings having an inner race 20 mounted on the lower portion of the hub 14 and having a plurality of conventional bearing balls 21 arranged between the inner bearing race 20 and an outer bearing race 22 mounted in the frame 18 spaced axially from the roller bearing supporting shoulder 19.

The table mounting frame 18 can be supported in any suitable manner and is preferably mounted on a channel frame 23, which forms the main base for the wear testing device. In the illustrated arrangement, the table mounting frame 18 is supported in an opening 24, which extends longitudinally of the base portion of the channel frame 23. A pair of lugs 25 is welded or otherwise suitably secured to the mounting frame 18 at substantially diametrically opposite points thereof, and each lug is secured to the base of the channel frame 23 in any suitable manner, as by bolts 26, which extend through openings in the lugs 25 and threadedly engage openings in the base of the channel frame member 23.

Figures 1, 2, 4:
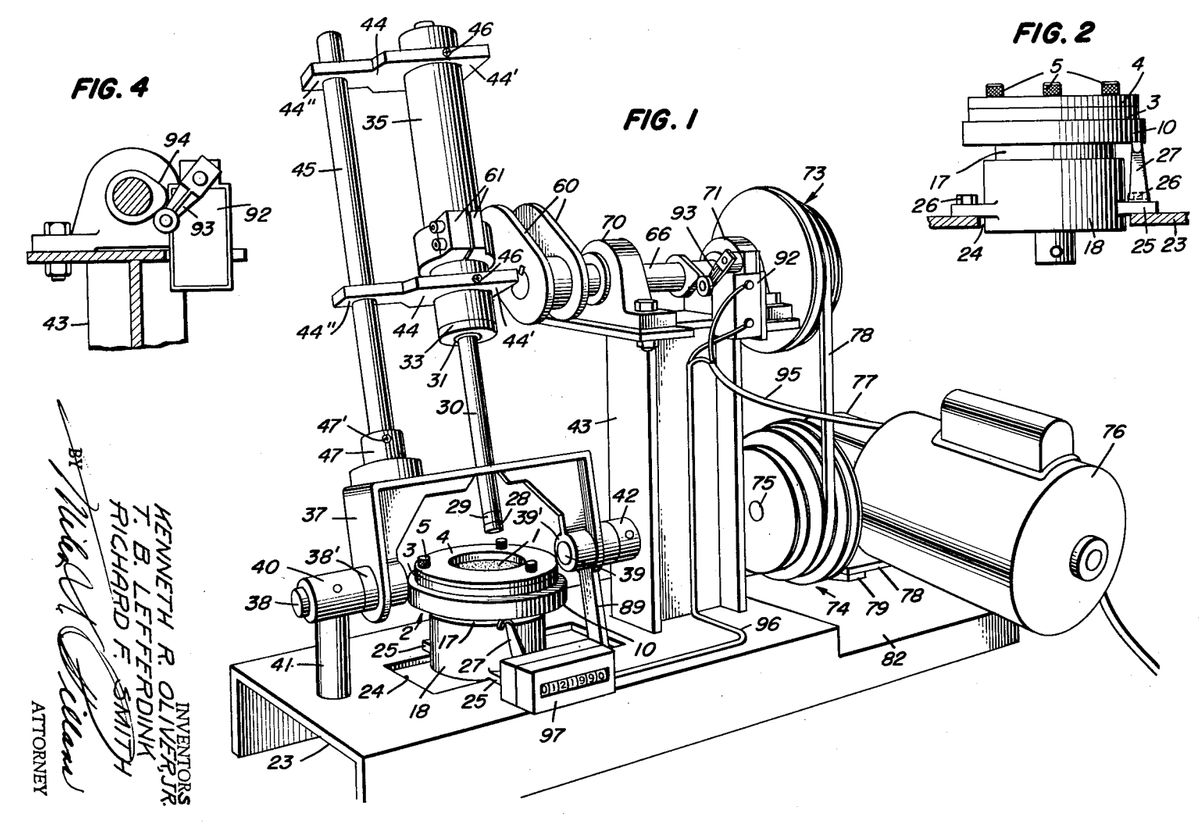
FIG. 1 is a perspective view of an improved wear testing device embodying the present invention particularly adapted for testing the wear or life characteristics of carpet and rug materials.
FIG. 2 is a side elevational view of the test specimen supporting table illustrating its mounting on the base of the device which is partly broken away and showing the resilient drag spring or brake for holding the table stationary during engagement of a test specimen by a loading member.
FIG. 4 is a sectional view taken along line 4—4 of FIG. 3 illustrating the counter mechanism.
Figures 3, 5:
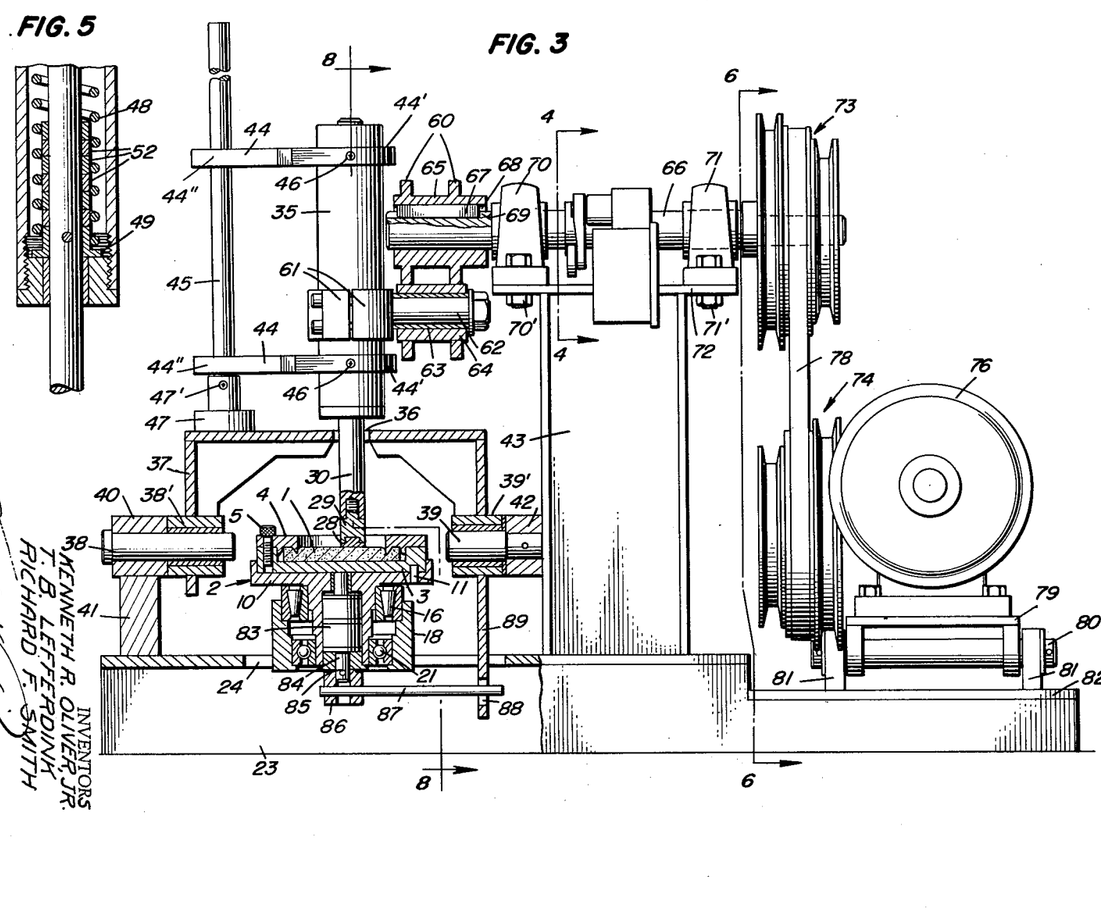
FIG. 3 is a side elevational view of the carpet wear testing device illustrated in FIG. 1.
FIG. 5 is a fragmentary sectional view of a portion of the loading device illustrating one manner for adjusting the inertial loading of the device.

The test specimen supporting table is resiliently held against rotation by a slip brake of any suitable type, which may comprise a simple leaf spring 27. This spring is arranged in frictional engagement with the underside of the table base 10 and conveniently stressed and held in this position by being clamped by one of the mounting bolts 26, as is more clearly shown in FIG. 2.

The desired loading of the test specimen 1 during tests is obtained by subjecting the exposed area of the specimen 1 to compressive and bending stresses applied thereto at predetermined angles under predetermined adjustable depths of penetration and at predetermined rates of operation. In addition, the mechanism is provided with an arrangement for preselecting the inertial loading to be applied to a specimen, as well as preselecting the maximum compressive stress to which it is to be subjected. This type of action is obtained through a stressing foot 28, of any suitable material and size, replaceably secured by a base 29 threadedly mounted on the end of a rocking reciprocating plunger 30. This type of test foot provides for varying the weight, and therefore the inertia, as well as the type of surface of the member which engages and stresses the test specimen. It also provides for varying the surface which is engaged during a test, so as more nearly to simulate the wear qualities of materials when the areas which are stressed are relatively large, as well as when the material is subjected to concentrated forces on relatively small areas, as by spike heels.

The angles of attack and departure of the stressing foot 28 on the test specimen 1 and the degree of penetration of the pile of the test specimen by the foot 28 may be preselected, and the penetration varied by the mounting of the plunger 30 on its operating mechanism. This mounting is provided by slidably supporting and guiding the plunger 30 in journal bearings 31 and 32 respectively mounted in bearing housings 33 and 34. These housings are mounted in opposite ends of an operating cylinder 35 in any suitable manner, as by threaded engagement therewith. The plunger 30 extends freely through an aperture 36 in a rocker frame 37 which is actuated synchronously with the plunger to provide a predetermined progressive advance of the specimen supporting table 2. The rocker frame 37 is oscillatably mounted on shafts 38 and 39, which respectively extend through hubs 38, and 39' secured to the two legs of the rocker frame 37. The shaft 38 is supported in a journal bearing mounted in a trunnion 40 secured to a post 41 mounted on the web of the channel frame 23 which forms the main base of the device. The other rocker frame-supporting shaft 39 is mounted in a bearing supported in a trunnion 42 which is secured to an I-beam post 43, also rigidly mounted on the web of the channel frame 23.

The wear of rug and carpet materials depends in part upon the maximum pressure exerted on the carpet as it is walked upon, and this, of course, varies greatly with the mode in which the person walks, as well as the weight of the person. Usually, when a person walks rapidly, a greater impact is imposed on a carpet than when walking more slowly. Furthermore, not only the maximum pressure to which the carpet is subjected varies with the mode of walking and weight of the individual, but the actual manner in which the strain is applied to the carpet pile varies with the mode in which the person walks and the weight of the person. These latter very materially affect the inertial loading or strain to which the carpet is subjected and affect the bending stresses developed in the carpet pile. The compressive stresses are mainly affected by the maximum weight applied to the carpet. In order to simulate all of these forces which affect the normal wear of a carpet, the present invention utilizes an arrangement for adjusting the maximum pressure to which the carpet is subjected during each engagement with the plunger foot 28 and also for adjustably varying the inertial loading of the foot 28.

Figures 8, 9:
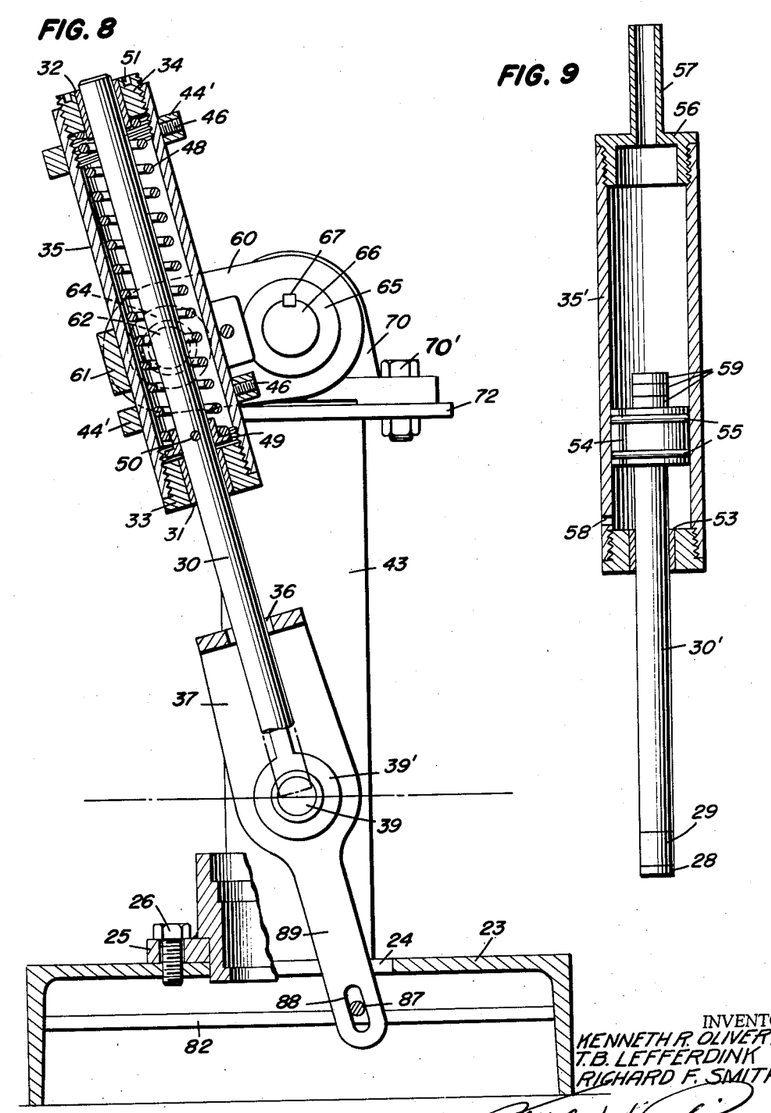
FIG. 8 is an enlarged sectional view taken along line 8—8 of FIG. 3 illustrating details of the loading device and its adjustable loading features with details of the mechanism for driving the test specimen supporting table.
FIG. 9 is a longitudinal sectional view through a modified form of the loading device shown in FIGS. 1, 3, 5, and 8.

The loading on the engaging foot 28 is determined by the maximum pressure applied to the foot by the plunger 30 when the plunger is substantially perpendicular to the surface of a test specimen. This pressure may be applied to the plunger 30 in any suitable manner. FIG. 8 illustrates a resilient compression coil spring 48 arranged within the cylinder 35 and held in compression therein between a spring seat formed by the inner surface of the bearing housing 34 and a spring seat 49 arranged around the plunger 30 and secured thereto in any suitable manner, as by a pin 50. The compressive force of the spring 48 transmitted to the plunger 30 through the spring seat 49 and the pin 50 may be adjusted by adjusting the relative axial position in the operating cylinder 35 of the spring seat formed by the bearing housing 34. This adjustment of the compression of the spring 48 may conveniently be made by applying a suitable wrench to sockets 51 in the outer end of the bearing housing 34. This construction provides an adjustable resilient spring loading mounting for controllably and resiliently loading the plunger foot whereby pressures of the foot on a specimen can be varied at will. These pressures, of course, cyclically vary from zero to the maximum determined by the compressive force of the spring 48 on the plunger 30 and are reduced to zero when the plunger foot 28 becomes disengaged from the rug surface. The adjustable spring loading not only controls the maximum pressure exerted by the plunger foot 28 on the rug, but also controls to a certain extent the rate of change of strain in the rug pile for any given speed of operation of the testing device as this strain varies from zero to the maximum pressure and back to zero during a fixed interval of time.

In order to vary the inertial loading of the plunger foot 28 on a test specimen, the mass of the force transmitting member comprising the foot 28 and its attachment to the plunger 30 may be varied by the addition or removal of weighting rings 52, loosely mounted on the plunger 30 between the spring seat 49 and the outer bearing 32. Such inertial loading can easily be varied simply by unscrewing the bearing housing 34 and adding or removing rings 52 and then replacing the bearing housing and adjusting it to a position to provide the desired maximum pressure to be applied to a test specimen by the resilient compressive force of the spring 48, as has been previously explained. This inertial loading also contributes to the control of the rate of change of the loading from zero to maximum stress on the test sample.

The adjustable resilient loading of the plunger foot 28 also can be provided in the form of an air pressure cushion which applies its compressive force to a plunger 30' during the portion of the operating cycle when the plunger foot 28 is in engagement with a test specimen. FIG. 9 illustrates an embodiment which can be utilized for applying this type of adjustable resilient loading to the plunger foot. In this construction, the plunger 30' is guidably mounted in an operating cylinder 35' by being supported therein by a journal bearing 53 and by being provided with a piston 54 which slidably engages the inner periphery of the cylinder 35'. This piston 54 preferably is provided with one or more piston sealing rings 55, which may be of the O-ring type, mounted in grooves extending circumferentially around the piston 54, so that the rings 55 provide a good sliding sealing engagement with the inner surface of the cylinder 35'.

The variable resilient loading of the plunger 30' is provided by closing the end of the cylinder 35' with a suitable cylinder head, which may conveniently be in the form of a cap 56 which threadedly engages and closes the end of the cylinder 35' opposite the bearing 53. This cap 56 preferably is formed with an air hose connecting tube 57, which may be formed integrally with the cap 56 and may be connected through any suitable flexible air hose to a source of air pressure. Any suitable valve may be arranged to control the air pressure applied to the cylinder 35', and, therefore, on the piston 54, so that the pressure may be varied as desired for controlling the loading of the plunger 30'. As in the spring-loaded construction shown in FIG. 8, pressure exerted on a test specimen by the plunger foot 28 will vary from zero as the foot initially engages the test specimen to a maximum as determined by the air pressure within the cylinder 35' exerted on the piston 54. Since the air within the cylinder 35' between the cylinder head formed by the cap 56 and the piston 54 is compressible, this provides a resilient cushioned loading of the plunger 30' as it engages a test specimen. In order to assure that the resilient loading on the plunger 30' is controlled by the pressure within the cylinder 35' applied to the piston from the source of compressed air, the cylinder 35' is formed with one or more vent openings 58 adjacent to the end of the cylinder 35' away from the cylinder head formed by the cap 56. This provides for the free ingress and egress of air from the cylinder 35' between the piston 54 and the end of the cylinder away from the source of compressed air, so that the pressure for loading the plunger 30' through the piston 54 is determined solely by the pressure of the compressed air.

The inertial loading of the plunger foot 28 may be varied in any suitable manner by changing the mass of the plunger. As shown in FIG. 9, this may be done by adding or removing suitable weights 59 secured to the plunger in any suitable manner, as by threaded engagement with the end of the piston 54. These weights can easily be added and removed from the piston 54 by unscrewing the cylinder cap 56 from the cylinder 35' and moving the plunger 30' to the outer end of the cylinder 35', thus making the end of the piston 54 readily accessible for adding or removing weights 59. In this manner, both the resilient maximum loading of the plunger foot 28 on the plunger 30' and its inertial loading can be very easily adjusted.

Operation of the illustrated wear testing device is provided through a mechanism which cyclically exerts a pressure on the plunger 30 tending to make it reciprocate toward and away from the test specimen table 2, while simultaneously rocking the plunger 30 relative to a contact point on the specimen mounting table. This operation requires that the operating cylinder 35 be guided in a reciprocating movement toward and away from the specimen supporting table while it is being rocked back and forth about the point of engagement of the plunger foot 28 with the test specimen. This is obtained by guiding the movement of the cylinder in relation to the table through a pair of brackets 44 secured to the cylinder and a rod 45 secured to the rocker frame 37. The two brackets 44 fixedly mounted in spaced relation on the cylinder 35 in any suitable manner and, in the illustrated embodiment, comprise circular ends 44' which embrace the cylinder and are secured thereto by set screws 46. The opposite ends 44" of the brackets are formed with apertures therethrough in which the rod 45 is slidingly fitted. The rod 45 is fixedly mounted on the frame 37 in any suitable manner, as by a base 47 rigidly secured to the frame and to which the rod is secured by a set screw 47'. Thus, the cylinder 35 and the frame 37 are held in alignment and in relatively movable relationship through the brackets 44 and rod 45.

The desired reciprocating drive of the plunger is obtained through a rotatable drive crank mechanism comprising a pair of crank arms 60 which are drivingly secured to the operating cylinder 35 through an adjustable connection. This connection comprises a split clamping ring 61 which securely grips the cylinder 35 and is adjustable longitudinally thereof in order to adjust the maximum penetration of the plunger foot 28 into the pile of a test specimen. This adjustable mounting of the cylinder 35 in the clamping ring 61 also can be utilized to adjust the resilient loading on the plunger 30. Movement of the cylinder 35 toward the rocker frame 34 can be used to increase the compression of the biasing spring 48 at the point of maximum pressure of the plunger on a test specimen. Reverse movement of the cylinder 35 can be used to decrease the maximum pressure of the plunger foot 28 on a test specimen and to decrease its penetration.

The clamping ring 61 is drivingly connected to the crank arms 60 through a stub shaft 62 supported in a journal bearing 63 mounted in a hub 64 connecting together the outer ends of the crank arms 60. The crank arms 60 are rigidly mounted on a hub 65 which is provided with a driving connection to a countershaft 66 formed in any suitable manner, as by a key 67 engaging a keyway 68 in the hub 65 and a keyway 69 in the shaft 66. The countershaft 66 is rotatably supported by suitable bearings mounted in bearing housings 70 and 71 supported on a pedestal platform 72 and secured thereto in any suitable manner, as by bolts 70' and 71'. The desired relative rigidity of the various operating parts of the wear testing device is further assured by rigidly mounting the pedestal platform 72 on the I-beam post 43, as by welding it thereto. In this manner, the support of the cylinder operating mechanism, the support for the rocker frame 37, and the support for the test specimen mounting table 2, all provide a rigid structure with the main channel frame base 23.

Figure 6:
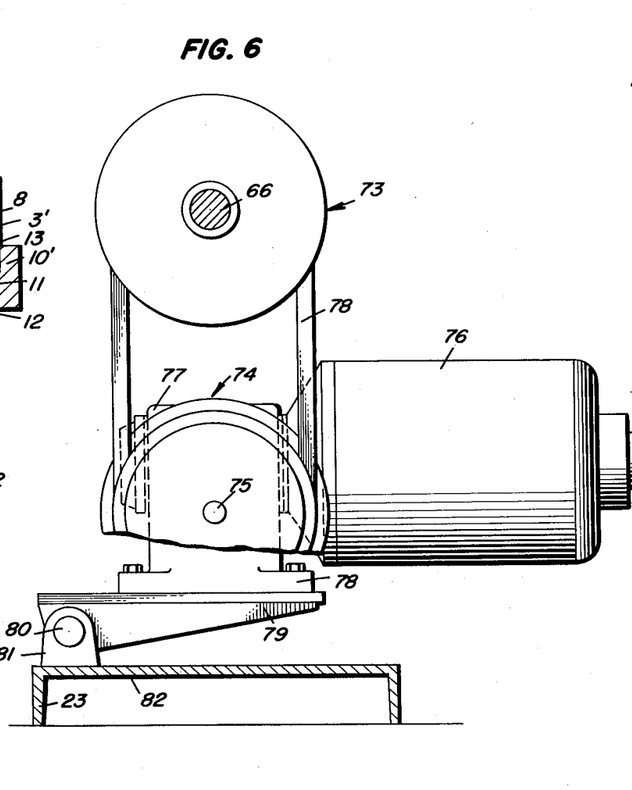
FIG. 6 is a sectional view taken along line 6—6 of FIG. 3 and partly broken away to illustrate the motor mounting and drive for the testing device.

Power is supplied to the countershaft 66 at predetermined variable speeds through suitable adjustable drive means which, in the illustrated embodiment, comprise complementary stepped pulleys 73 and 74, drivingly mounted respectively on the countershaft 66 and on a gearbox output shaft 75. The output shaft 75 is supplied with power from any suitable source which may include an electric motor 76 which is drivingly connected to the shaft 75 through suitable reduction gearing in a gearbox 77. As is more clearly shown in FIG. 6, power is transmitted from the stepped pulley 74 to the stepped pulley 73 through a suitable belt 78, such as a V-belt. The belt 78 is conveniently held under the desired driving tension by mounting the motor 76, gearbox 77, and the stepped pulley 74 on a pedestal 78 secured to a platform 79, which is pivotally mounted on a shaft 80. This shaft is rotatably supported in bearings formed in bosses 81 which are rigidly mounted on a platform 82 extending between and rigidly secured to the sides of the channel frame 23. In this manner, the weight of the motor, gearbox, and stepped pulley pivots into the loop of the belt 78 about the axis of the shaft 80 so as to maintain driving tension on the belt.

In order successively to present a different area of a test specimen to engagement with the foot 28, the specimen mounting table 2 is adapted to be moved during each portion of the operating cycle while the plunger foot 28 is raised out of contact with a test specimen. This movement of the specimen mounting table 2 preferably is such as to cyclically return a given test specimen engagement area to the engagement position, so that the same area may be repetitively engaged, with a rest period occurring between engagements with the plunger foot 28. Such movement of the table is conveniently obtained by advancing the table through an angle after each engagement of a test specimen with the plunger foot 28.

In the illustrated embodiment of this invention, the step-by-step advance of the test specimen mounting table is conveniently obtained by driving the table through a one-way clutch mechanism. This clutch mechanism comprises a one-way drive clutch 83 which is mounted in the hub 14 of the table base 10 and is provided with a clutch drive shaft 84 drivingly connected in any suitable manner, as by a pin 85 extending through the shaft 84, to a coupling 86. This coupling is rigidly connected to a drive bar 87 which extends into a slot 88 in an arm 89 formed as an integral extension of one side of the rocker frame 37.

Figure 10:
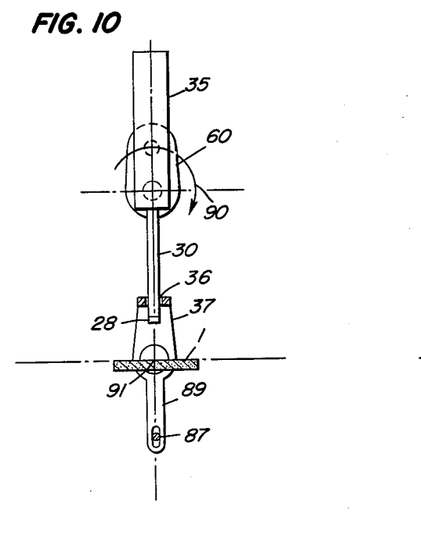
FIGS. 10, 11, 12, and 13 illustrate various positions of the loading device during a cycle of operation.
Figure 11:
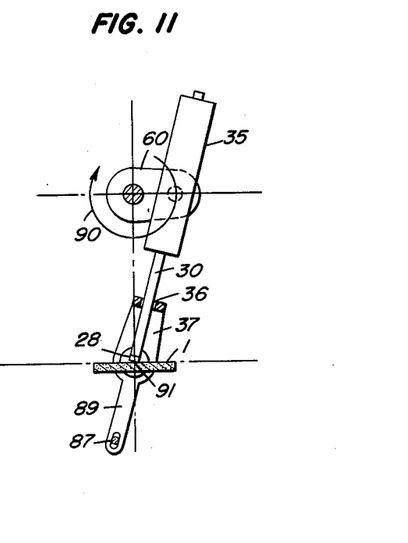
Figure 12:
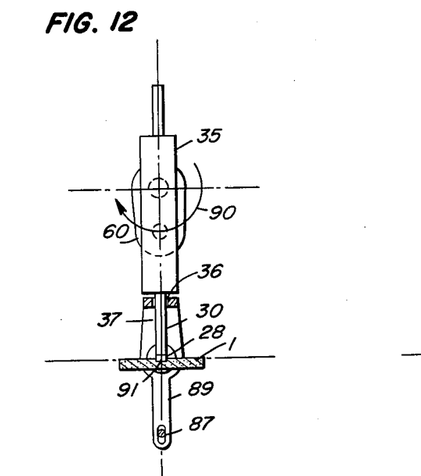

The combined adjustable loading drive of the plunger foot 28 which provides for reciprocation of the plunger with a simultaneous rocking thereof to simulate normal walking on the surface of a carpet with the periodic movement of the test specimen mounting table during the disengaged portion of the plunger foot with the test specimen is more clearly illustrated with reference to FIGS. 10–13. As shown in these figures, when the crank arms 60 are raised so that the operating cylinder 35 is in its uppermost position, the plunger 30 also is moved the farthest away from a test specimen 1 and the device is adapted to be driven in the direction indicated by the arrow 90, so that the crank arms 60 move in a clockwise direction as seen in FIGS. 10–13. In moving from the position shown in FIG. 10 to the position shown in FIG. 11, the operating cylinder 35 is moved to the right and downwardly, so that the plunger 30 exerts a turning movement on the rocker frame 34 which oscillates the frame 37 and the plunger 30 about a specimen engagement point 91 which is substantially along the axis of the rocker frame shafts 38 and 39. When the crank arms 60 have moved substantially 90° from their dead center position, shown in FIG. 10, to the position shown in FIG. 11, the plunger 30 will have moved to a position at which the plunger foot 28 engages a test specimen 1 at a predetermined acute angle of attack. Further drive of the crank arms 60 in a clockwise direction, from the position shown in FIG. 11 to the position shown in FIG. 12, causes a rocking of the plunger 30 from its initial angle of attack to a position substantially perpendicular to the test specimen 1. This movement of the crank arms 60 carries the operating cylinder 35 to its maximum downward position, thereby exerting maximum compressive strain on the test specimen 1 by the plunger 30. Continued drive by the crank arms 60 in a clockwise direction from the position shown in FIG. 12 to the position shown in FIG. 13, causes the plunger 30 to continue to rock about the point of engagement 91 past the vertical position to another predetermined acute angle, at which time the plunger foot becomes disengaged from the test specimen 1. In the part of the operating cycle illustrated in FIGS. 11, 12, and 13 from the initial engagement of the plunger foot with a test specimen as shown in FIG. 11 to the maximum strain position shown in FIG. 12 and continued to the departure position shown in FIG. 13, the carpet material is subjected to a reversal of bending stress and to compression which varies from zero to a maximum and back to zero, while the bending stress undergoes a reversal of direction from the position shown in FIG. 11 to the position shown in FIG. 13.

Figure 13:
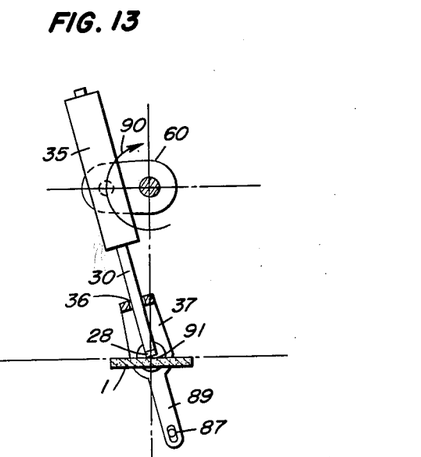

The plunger is returned to its initial engagement position, FIG. 11, from its departure position, FIG. 13, by continued rotation of the crank arms 60, as indicated by the arrow 90. Such continued rotation raises the operating cylinder 35 from the position shown in FIG. 13 to the position shown in FIG. 10, which raises the plunger 30 away from the test specimen 1 and rocks the plunger 30 and the rocker frame 37 in a clockwise direction, as seen in FIGS. 13, 10, and 11. This rocking of the frame 37 produces a corresponding rocking of the arm 89, which transmits its rocking motion into an oscillatory movement of the end of the drive bar 87 and through it to the one way clutch 83. The clutch 83 is constructed and arranged so as to drive the test specimen mounting table 2 during the oscillatory drive of the bar 87 from the position shown in FIG. 13, which corresponds to the point of disengagement or departure of the plunger foot 28 from the test specimen, to the position shown in FIG. 11, which corresponds to the initial point of engagement of the plunger foot 28 with the test specimen. Thus, the clutch is arranged to drive or advance the specimen mounting table through a predetermined angle, as determined by the oscillation of the drive bar 87, during the portion of the operating cycle while the plunger foot is raised out of contact with the test specimen 1 and is being returned to its initial specimen engaging position. During the portion of the cycle while the plunger foot is in engagement with the test specimen 1, the drive bar 87 is oscillated in a reverse direction from that part of the cycle during which the plunger is raised, and, when oscillated in this opposite direction the one way drive clutch 83 is adapted to release its driving connection between the shaft 84 and the mounting table base 10, so that the braking spring 27 frictionally holds the specimen table 2 stationary.

The number of cycles of operation; that is, the number of times a test specimen is stressed by the plunger foot, is automatically counted in any suitable manner. In the illustrated embodiment, this includes a microswitch 92 mounted on the pedestal platform 72 and having an operating finger 93 arranged to be actuated once each revolution of the shaft 66 by a cam 94 drivingly mounted on the shaft 66. The microswitch is connected through conductors 95 to a source of electric power and through conductors 96 to an electric register 97 mounted on the frame 23, so that the cycles of operation can quickly and easily be read from the front of the testing device.

In order to simulate variations in carpet wear resulting from different angles of attack due to various factors, such as different sizes of shoes and different lengths of stride, it is desirable that the length of the operating arm which drives the plunger cylinder 35 may be adjustable. This may be obtained by various mechanical expedients, three embodiments of which are illustrated in FIGS. 14–17.

Figure 14:
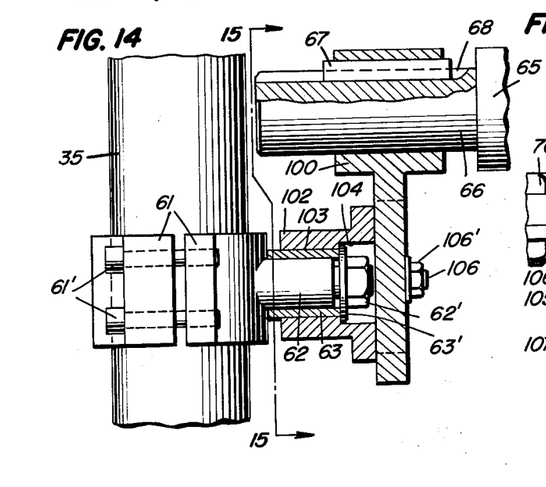
FIG. 14 is a fragmentary side elevational view, partly in section, illustrating a modification of the drive and mounting connection of the plunger operating cylinder to the drive shaft of the apparatus.
Figure 15:
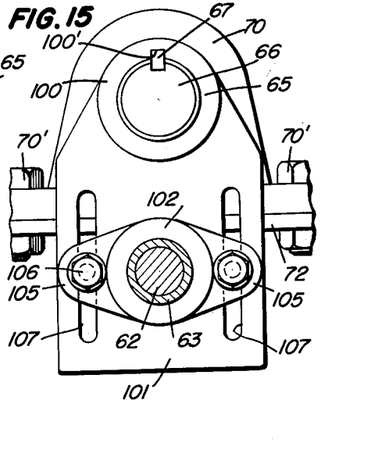
FIG. 15 is a sectional view, taken along line 15—15 of FIG. 14, illustrating details of the adjustable connection between the plunger operating cylinder and its drive shaft.

In FIGS. 14 and 15 the plunger operating cylinder 35 is shown connected to its drive shaft 66 through its mounting clamp 61 and stub shaft 62 secured to an adjustable driving crank structure. This driving crank structure comprises a hub 100 drivingly mounted on the drive shaft 66 by a key 67, which engages a keyway 68 in the shaft 66 and a keyway 100' in the hub 100. The crank structure in this embodiment includes a flange 101 which extends from the hub 100 and preferably is formed integrally therewith. The cylinder clamp 61 is connected to the flange 101 through a mounting member comprising a hub 102 having a central aperture 103 formed therein with a countersunk opening 104 at one end thereof. The cylinder mounting clamp stub shaft 62 is rotatably supported by bearing 63 in the central aperture 103 of the hub 102 and is secured in position therein by a suitable nut 62' which threadedly engages the end of the stub shaft 62 over a washer 63'. This washer 63' and nut 62' extend in the countersunk portion 104 of the hub 102.

The hub 102 is formed with a pair of laterally extending ears 105 which provide for adjustably securing the hub 102 to the flange 101. Each ear 105 is secured to the flange 101 by a suitable bolt 106, which extends through an opening in the ear 105 and an elongated slot 107 extending longitudinally of the flange 101. A suitable nut 106' on each bolt 106 provides for ready adjustment of the position of the mounting hub 102 relative to the drive shaft 66, such that the distance between the centers of the drive shaft 66 and the stub shaft 62 is adjustable within a predetermined range for thereby adjusting the length of the operating arm which drives the plunger actuating cylinder 35. Variation of the distance between the centers of the shafts 62 and 66 provides for a different throw of the crank arm structure which drives the plunger from the drive shaft and therefore provides for an adjustable predetermined acute angle of attack on engagement of the plunger 30 with a test sample and also for a corresponding adjustable predetermined acute angle of departure of the plunger from the test sample. Adjustment of the effective length of the crank arm may require an adjustment of the spring or fluid loading of the plunger in order to obtain the desired maximum pressure on a test specimen. This can readily be done as explained with reference to FIGS. 8 and 9. In this manner, another variable factor affecting the wear of floor coverings can readily be simulated with an apparatus incorporating the present invention.

Figure 16:
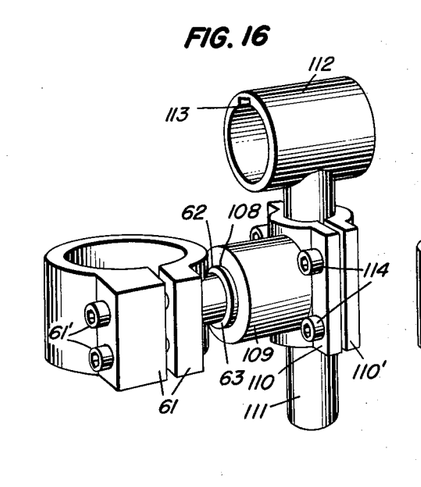
FIG. 16 is a perspective view of another embodiment of an adjustable connection of the plunger operating cylinder to its drive shaft.

FIG. 16 illustrates another embodiment for varying the angle of attack and angle of departure of the test plunger with reference to a test sample by variation of the operating crank arm which connects the plunger cylinder 35 to its drive shaft 66. In this construction, the stub shaft 62 which is connected to the cylinder clamp 61 is rotatably mounted in a bearing 63 arranged in a central aperture 108 of a mounting hub 109 in the same manner as is shown in FIG. 14. In this construction the mounting hub 109 extends from one side of part 110 of a two part hub 109. This two part clamp provides for adjustably securing the mounting hub 109 to a crank arm 111, which extends from and preferably is formed integral with a hub 112 drivingly mounted on the drive shaft 66 in any suitable manner, similar to that shown in FIG. 14 by a key adapted to engage a keyway in the drive shaft and a keyway 113 in the hub 112.

The effective length of the crank arm structure which drives the plunger cylinder 35 from the drive shaft 66 is readily adjustable by securing the two part clamp to provide the desired distance between the axis of the stub shaft 62 and the axis of the hub 112. This can readily be obtained simply by moving the two part clamp longitudinally of the crank arm 111. Adjustment of the two part clamp and its mounting on the crank arm 111 is provided for by clamping two parts 110 and 110' of the two part clamp in the desired position in any suitable manner, as by bolts 114 which extend through the parts 110 and 110' of the clamp. Adjustment of the effective length of the crank arm drive by adjustment of the position of the clamp mounting on the crank arm 111 provides for the desired adjustment of the predetermined acute angles of attack and departure of the plunger in relation to a test specimen in the same manner as the structure shown in FIGS. 14 and 15.

Figure 17:
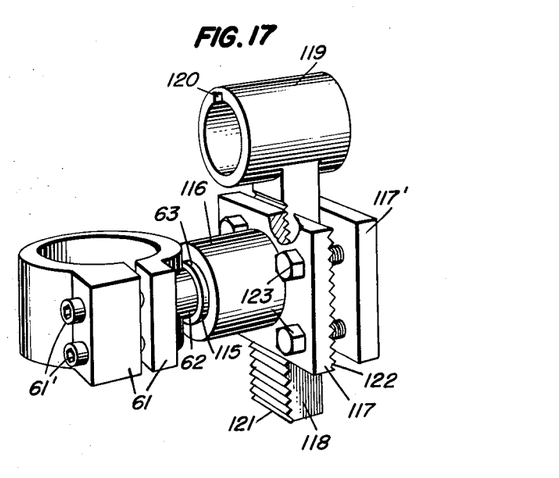
FIG. 17 is a further modification of an adjustable connection for the plunger operating cylinder to its drive shaft.

FIG. 17 illustrates a further construction for adjusting the angles of attack and departure of the test plunger with reference to a test specimen. In this construction, the stub shaft 62 is rotatably mounted in a bearing 63 in a central aperture 115 of a hub 116 in the same manner as that shown in FIGS. 14 and 15. The hub 116 preferably is formed integral with a part 117 of a two part clamp, which is adapted to be adjustably mounted on an operating crank arm 118. The crank arm 118 is secured to and preferably made integral with a hub or collar 119 which is drivingly mounted on drive shaft 66 in any suitable manner, as by a key which engages a keyway in the drive shaft 66 and a keyway 120 in the hub 119.

Positive location of the clamp is assured by making one side of the crank arm 118 and the face of the clamp part 117 away from the hub 116 with transversely extending complementary serrations or teeth 121 and 122 respectively and securely fastening these together to provide the desired effective crank arm length. This effective crank arm length is determined by the distance between the axis of the stub shaft 62 and the axis of the hub 119 in the same manner as in the structure shown in FIGS. 14, 15, and 16, and this effective length is determined by the position in which the part 117 of the clamp is secured to the operating crank arm 118. This position is readily adjustable and maintained by securing the part 117 to the crank arm 118 with the serrations 122 in engagement with the serrations 121 to provide the desired distance between the axis of the stub shaft 62 and the hub 119 and is held in this position by being secured in clamping engagement therewith in any suitable manner, as by a plurality of bolts 123 extending through suitable openings in the clamp part 117 and threadedly engaging tapped holes in a plate 117', which forms the second part of the two part clamp. If desired, the bolts 123 can be of the type which are secured in position by nuts which threadedly engage the ends of the bolts on the outer side of the clamp plate 117', and the holes through this plate would then be made with smooth cylindrical surfaces to provide for the easy passage of the bolts 123 through such holes. Adjustment of the effective crank arm for driving the plunger operating cylinder 35 and thereby adjusting the acute angles of attack and departure of the test plunger can thus readily be obtained by adjusting the position in which the two part clamp is secured to the operating crank arm 118.

While a particular embodiment of a wear testing device and variations of certain parts have been illustrated and described, modifications thereof will occur to those skilled in the art. It is to be understood, therefore, that this invention is not to be limited to the particular details disclosed, and it is intended in the appended claims to cover all modifications within the spirit and scope of the invention.

What is claimed is:

1. A wear testing device comprising a table for supporting a test specimen, means for repetitively engaging a specimen and for exerting a progressively varying pressure on the specimen from zero to an adjustable predetermined maximum and back to zero during each engagement and initially engaging the specimen at an adjustable predetermined acute angle of attack at zero pressure and progressively varying the angle of application of pressure on the specimen from said initial acute angle of attack past the perpendicular to the specimen at substantially said maximum pressure to an adjustable predetermined acute angle of departure therefrom at zero pressure and returning said means raised out of contact with the specimen to the initial specimen engaging position, and means for holding said specimen relatively fixedly during engagement thereof by said engaging means.

2. A wear testing device comprising a movably mounted table for supporting a test specimen, means for repetitively engaging a specimen and for exerting a progressively varying pressure on the specimen from zero to an adjustable predetermined maximum and back to zero during each engagement and initially engaging the specimen at an adjustable predetermined acute angle of attack at zero pressure and progressively varying the angle of application of pressure on the specimen from said initial acute angle of attack past the perpendicular to the specimen at substantially said maximum pressure to an adjustable predetermined acute angle of departure therefrom at zero pressure and returning said means raised out of contact with the specimen to the initial specimen engaging position, means for holding said table stationary during specimen engagement by said engaging means and for moving said table while said engaging means is raised out of contact with the specimen to present a different part of the specimen for successive engagements thereof, and means for adjusting the inertial loading of said engaging means.

3. A wear testing device comprising a rotatable table for supporting a test specimen, means including a foot for engaging and exerting pressure on a specimen, said latter means including a plunger for mounting and operating said foot, means comprising a cylinder having a mounting for said plunger therein for actuating said plunger foot into engagement with a specimen, means comprising a rocking drive and mounting for said cylinder having a rocking axis substantially in the plane of said table including an adjustable length crank drive pivotally secured to said cylinder at a position adjustable longitudinally of said cylinder and rockable mounting means guiding said plunger axially of said cylinder for repetitively actuating said plunger toward and away from said table by said cylinder whereby the pressure of said plunger foot on a specimen supported on said table progressively varies from zero to a predetermined maximum and back to zero during each operation while simultaneously initially moving said foot into engagement with a specimen at an adjustable predeterminable acute angle of attack at zero pressure and progressively varying the angle of application of pressure by said foot on the specimen from said initial acute angle of attack past the perpendicular to the specimen at said maximum pressure to a predeterminable acute angle of departure therefrom at zero pressure and returning said foot raised out of contact with the specimen to the initial specimen engaging position, and means for rotating said table while said foot is raised out of contact with a specimen and is being returned to said initial position whereby a different part of the specimen is presented for successive engagements by said foot and disengaging said table drive while said foot is in engagement with a specimen.

4. A wear testing device comprising an indexably rotatable table for supporting a test specimen, means including a foot for engaging and exerting pressure on a specimen, said latter means including a plunger for mounting and operating said foot, means comprising a cylinder having an adjustable resilient spring loaded mounting for said plunger therein for controlling the pressure of said foot on a specimen, means comprising a rocking drive and mounting for said cylinder having a rocking axis substantially in the plane of said table including an adjustable length rotatable crank drive pivotally secured to said cylinder at a position adjustable longitudinally of said cylinder and rockable mounting means guiding said plunger axially of said cylinder for repetitively operating said plunger by said cylinder whereby the pressure of said plunger foot on a specimen supported on said table progressively varies from zero to an adjustable predetermined maximum and back to zero during each operation while simultaneously initially moving said foot into engagement with a specimen at an adjustable predeterminable acute angle of attack at zero pressure and progressively varying the angle of application of pressure by said foot on the specimen from said initial acute angle of attack past the perpendicular to the specimen at said maximum pressure to an adjustable predeterminable acute angle of departure therefrom at zero pressure and returning said foot raised out of contact with the specimen to the initial specimen engaging position, and means comprising a one way indexing drive for rotating said table while said foot is raised out of contact with a specimen and is being returned to said initial position whereby a different part of the specimen is presented for successive engagements by said foot and disengaging said table drive while said foot is in engagement with a specimen.

5. A wear testing device comprising a table for supporting a test specimen, means including a foot for engaging and exerting pressure on a specimen, said latter means including a plunger for mounting and operating said foot, means comprising a cylinder having a mounting for said plunger therein for actuating said plunger foot into engagement with a specimen, means comprising a rocking drive and mounting for said cylinder having a rocking axis substantially in the plane of said table including an adjustable length crank drive pivotally secured to said cylinder at a position adjustable longitudinally of said cylinder and rockable mounting means guiding said plunger axially of said cylinder for repetitively actuating said plunger toward and away from said table by said cylinder whereby the pressure of said plunger foot on a specimen supported on said table progressively varies from zero to a predetermined maximum and back to zero during each operation while simultaneously initially moving said foot into engagement with a specimen at an adjustable predeterminable acute angle of attack at zero pressure and progressively varying the angle of application of pressure by said foot on the specimen from said initial acute angle of attack past the perpendicular to the specimen at said maximum pressure to a predeterminable acute angle of departure therefrom at zero pressure and returning said foot raised out of contact with the specimen to the initial specimen engaging position, means for progressively moving said table while said foot is raised out of contact with a specimen and is being returned to said initial position whereby a different part of the specimen is presented for successive engagements by said foot and disengaging said table drive while said foot is in engagement with a specimen, and means for adjusting the inertial loading of said specimen engaging means.

6. A wear testing device comprising an indexably rotatable table for supporting a test specimen, means including a foot for engaging and exerting pressure on a specimen, said latter means including a plunger for mounting and operating said foot, means comprising a cylinder having an adjustable resilient spring loaded mounting for said plunger therein for controlling the pressures of said foot on a specimen, means comprising a rocking drive and mounting for said cylinder having a rocking axis substantially in the plane of said table including an adjustable length rotatable crank drive pivotally secured to said cylinder at a position adjustable longitudinally of said cylinder and rockable mounting means guiding said plunger axially of said cylinder for repetitively operating said plunger by said cylinder whereby the pressure of said plunger foot on a specimen supported on said table progressively varies from zero to an adjustable predetermined maximum and back to zero during each operation while simultaneously initially moving said foot into engagement with a specimen at an adjustable predeterminable acute angle of attack at zero pressure and progressively varying the angle of application of pressure by said foot on the specimen from said initial acute angle of attack past the perpendicular to the specimen at said maximum pressure to an adjustable predeterminable acute angle of departure therefrom at zero pressure and returning said foot raised out of contact with the specimen to the initial specimen engaging position, means comprising a one way indexing drive for rotating said table while said foot is raised out of contact with a specimen and is being returned to said initial position whereby a different part of the specimen is presented for successive engagements by said foot and disengaging said table drive while said foot is in engagement with a specimen, and means for adjusting the weight of said specimen engaging means to vary the inertial loading thereof.

References Cited in the file of this patent

UNITED STATES PATENTS

| | | |
|---|---|---|
| 2,032,202 | Dennis | Feb. 25, 1936 |
| 2,603,083 | Schiefer | July 15, 1952 |
| 2,895,326 | Fesperman et al. | July 21, 1959 |

FOREIGN PATENTS

| | | |
|---|---|---|
| 602,067 | Germany | Aug. 31, 1934 |